(12) United States Patent
Matsushita et al.

(10) Patent No.: US 6,210,625 B1
(45) Date of Patent: Apr. 3, 2001

(54) METHOD FOR PRODUCING GRANULATED MATERIAL

(75) Inventors: Mitsuhiro Matsushita, Tokorozawa; Shinpei Inamura, Tokyo, both of (JP)

(73) Assignee: Mikuni Corporation, Kushiro (JP)

( * ) Notice: Subject to any disclaimer, the term of this patent is extended or adjusted under 35 U.S.C. 154(b) by 0 days.

(21) Appl. No.: 09/147,152

(22) PCT Filed: Feb. 18, 1997

(86) PCT No.: PCT/JP97/00429

§ 371 Date: Mar. 29, 1999

§ 102(e) Date: Mar. 29, 1999

(87) PCT Pub. No.: WO97/30782

PCT Pub. Date: Aug. 28, 1997

(30) Foreign Application Priority Data

Feb. 20, 1996 (JP) .................................... 8-032443
Jan. 18, 1997 (JP) .................................... 9-039664

(51) Int. Cl.[7] ................................ B28B 1/30; B28B 7/34
(52) U.S. Cl. ................... 264/610; 264/628; 264/635; 264/636; 264/109; 264/125; 264/232; 264/234; 426/514; 419/5; 419/61; 419/66
(58) Field of Search .................... 264/610, 628, 264/635, 636, 109, 125, 232, 234; 426/514; 419/5, 61, 66

(56) References Cited

U.S. PATENT DOCUMENTS

| | | | |
|---|---|---|---|
| 4,919,973 | * 4/1990 | Alkan et al. | 427/213 |
| 5,157,084 | * 10/1992 | Lee et al. | 525/301 |
| 5,158,804 | * 10/1992 | Alkan et al. | 427/213 |
| 5,521,253 | * 5/1996 | Lee et al. | 525/301 |

* cited by examiner

*Primary Examiner*—Christopher A. Fiorilla
(74) *Attorney, Agent, or Firm*—Armstrong, Westerman, Hattori, McLeland & Naughton, LLP

(57) ABSTRACT

The invention is a method of making a novel spherical form of granulated products that can be effectively used in various product forms in drug, fertilizer, foodstuff, feed, agricultural chemical, catalyst, ceramics, powder metallurgy, detergent, plastic, and bio-material fields, for instance, as catalysts, lightweight materials, sound-insulating materials, microcapsules, and lightweight aggregates. To obtain a granulated product which is a spherical solid shell having a spherical space therein, a polymer having high water absorption properties is swollen by the absorption of water therein, and then brought in contact with a powder to form a powder layer all over the surface of the swollen polymer particle. This spherical particle is then dried and fired if necessary.

87 Claims, 3 Drawing Sheets

METHOD FOR PRODUCING GRANULATED MATERIAL

BACKGROUND OF THE INVENTION

The present invention relates generally to a method of making a novel granulated product, and more particularly to a method of making a granulated product comprising a spherical shell and having a spherical space within it. More preferably, the present invention relates to a method of making a novel granulated ceramic product, especially a granulated ceramic product comprising a spherical shell and having a spherical (hollow) space within it. In the present disclosure, it is understood that by the term "granulated product" are intended various forms of products inclusive of granules, particles, tablets, pellets, clinkers, spheres, cubes, and beads.

So far, granulated products have applications in a wide range of industrial fields concerning pharmaceutics, fertilizers, foodstuffs, feeds, agriculture, catalysts, coloring materials, ceramics, powder metallurgy, detergents, cosmetics, plastics, and biotechnology.

Such granulated products have been manufactured by various methods such as tumbling granulation, compression granulation, agitation granulation, extrusion granulation, crushing granulation, fluidized bed granulation, melt cooling granulation, spray drying granulation, liquid phase granulation, vacuum freeze granulation, and in-liquid granulation.

With these granulation techniques, however, it is not easy to obtain granulated hollow products; only limited types of hollow products produced by dedicated granulation techniques represented by spray drying granulation are now available.

A primary object of the present invention is to provide a granulated product-making method that enables a hollow product having any desired, easily controllable particle size to be easily produced.

SUMMARY OF THE INVENTION

Such an object is achievable by the inventions defined below as (1) to (86).

(1) A method of making a granulated product comprising a spherical solid shell and having a spherical space therein, characterized by allowing a polymer particle having high water absorption properties to be swollen by absorption of water therein, and bringing the water-swollen polymer particle into contact with a powder to form a powder layer all over the surface of the water-swollen polymer particle, followed by drying.

(2) A granulated product-making method as recited in (1), wherein said powder is an organic material.

(3) A granulated product-making method as recited in (1), wherein said powder is an inorganic material.

(4) A granulated product-making method as recited in any one of (1) to (3), wherein said powder contains a binder.

(5) A granulated product-making method as recited in (3) or (4), wherein said inorganic material is a ceramic raw material.

(6) A method of making a granulated product comprising a spherical ceramic shell and having a spherical space therein, characterized by allowing a polymer particle having high water absorption properties to be swollen by absorption of water therein, and bringing the water-swollen polymer particle into contact with a ceramic raw material powder to form a ceramic raw material powder layer all over the surface of the water-swollen polymer particle, followed by drying, and firing.

(7) A granulated product-making method as recited in any one of (1) to (6), wherein said drying is carried out by dielectric heating in a high-frequency dielectric heating system.

(8) A granulated ceramic product-making method as recited in (6), wherein said drying and said firing are carried out by dielectric heating in a high-frequency dielectric heating system.

(9) A granulated product-making method, characterized in that the granulated product obtained by the method recited in any one of (1) to (8) is immersed in a liquid to impregnate the shell of said granulated product with said liquid.

(10) A granulated product-making method as recited in (9), wherein said liquid is a metal salt solution.

(11) A granulated product-making method, characterized in that the granulated product obtained by the method recited in any one of (1) to (8) is immersed in a suspension of finely divided solid powder, and dried to incorporate the finely divided solid powder into the shell of said granulated product.

(12) A granulated product-making method, characterized in that the granulated product obtained by the method recited in any one of (1) to (11) is immersed in a liquid to occlude said liquid in the spherical space in said granulated product.

(13) A granulated product-making method, characterized in that the granulated product obtained by the method recited in any one of (1) to (11) is placed in a gas to occlude said gas in the spherical space in said granulated product.

(14) A granulated product-making method as recited in any one of (1) to (13), wherein said polymer having high water absorption properties is a spherical powder having a particle size of 0.02 to 3.0 mm.

(15) A granulated product-making method as recited in any one of (1) to (13), wherein said polymer having high water absorption properties is a small sphere having a particle diameter of 0.2 to 60.0 mm.

(16) A granulated product-making method as recited in any one of (1) to (15), wherein a ratio of the polymer having high water absorption properties to the water is 1:50 to 1:500.

(17) A granulated product-making method as recited in any one of (5) to (16), wherein said ceramic raw material or ceramic is at least one member selected from the group consisting of clay, a clay mineral, chamotte, silica sand, steatite, feldspar, alumina, magnesia, mullite, zirconia, silica, cordierite, ferrite, apatite, blast-furnace slag, shirasu, fly ash, silicon carbide, aluminum nitride, and silicon nitride.

(18) A granulated product-making method as recited in any one of (5) to (16), wherein said ceramic raw material or ceramic is a mixture of a binder and at least one member selected from the group consisting of clay, a clay mineral, chamotte, silica sand, steatite, feldspar, alumina, magnesia, mullite, zirconia, silica, cordierite, ferrite, apatite, blast-furnace slag, shirasu, fly ash, silicon carbide, aluminum nitride, and silicon nitride.

(19) A granulated product-making method as recited in any one of (1) to (18), wherein said powder is a pharmaceutical material.

(20) A granulated product-making method as recited in any one of (1) to (18), wherein said powder is a fertilizer material.

(21) A granulated product-making method as recited in any one of (1) to (18), wherein said powder is a foodstuff material.

(22) A granulated product-making method as recited in any one of (1) to (18), wherein said powder is a cement material.

(23) A granulated product-making method as recited in any one of (1) to (18), wherein said powder is a feed material.

(24) A granulated product-making method as recited in any one of (1) to (18), wherein said powder is a coloring material.

(25) A granulated product-making method as recited in any one of (1) to (18), wherein said powder is a material for agricultural chemicals.

(26) A granulated product-making method as recited in any one of (1) to (18), wherein said powder is a cosmetic material.

(27) A granulated product-making method as recited in any one of (1) to (18), wherein said powder is an enzyme-containing material.

(28) A granulated product-making method as recited in any one of (1) to (18), wherein said powder is a surfactant material.

(29) A granulated product-making method as recited in any one of (1) to (18), wherein said powder is a semiconductor material.

(30) A granulated product-making method as recited in any one of (1) to (18), wherein said powder is a metal material.

(31) A granulated product-making method as recited in any one of (1) to (18), wherein said powder is a multi-capsulated material.

(32) A granulated product-making method as recited in any one of (1) to (18), wherein said powder is a cermet material.

(33) A granulated product-making method as recited in any one of (1) to (18), wherein said powder is a paint coating material.

(34) A granulated product-making method as recited in any one of (1) to (18), wherein said powder is a filtering material.

(35) A granulated product-making method as recited in any one of (1) to (18), wherein said powder is a heat-insulating material.

(36) A granulated product-making method as recited in any one of (1) to (18), wherein said powder is a sound-absorbing material.

(37) A granulated product-making method as recited in any one of (1) to (18), wherein said powder is an electric wave-absorbing material.

(38) A granulated product-making method as recited in any one of (1) to (18), wherein said powder is a light-absorbing material.

(39) A granulated product-making method as recited in any one of (1) to (18), wherein said powder is a reflecting material.

(40) A granulated product-making method as recited in any one of (1) to (18), wherein said powder is a signposting material.

(41) A granulated product-making method as recited in any one of (1) to (18), wherein said powder is a ball bearing material.

(42) A granulated product-making method as recited in any one of (1) to (18), wherein said powder is a bio-reactor material.

(43) A granulated product-making method as recited in any one of (1) to (18), wherein said powder is a far infrared ray-radiating material.

(44) A granulated product-making method as recited in any one of (1) to (18), wherein said powder is an electric heating material.

(45) A granulated product-making method as recited in any one of (1) to (18), wherein said powder is a lightweight aggregate material.

(46) A granulated product-making method as recited in any one of (1) to (18), wherein said powder is a material for ball games.

(47) A granulated product-making method as recited in any one of (1) to (18), wherein said powder is a dehumidifying material.

(48) A granulated product-making method as recited in any one of (1) to (18), wherein said powder is a furnace material.

(49) A granulated product-making method as recited in any one of (1) to (18), wherein said powder is a material for engine room walls.

(50) A granulated product-making method as recited in any one of (1) to (18), wherein said powder is a material for gas turbine room walls.

(51) A granulated product-making method as recited in any one of (1) to (18), wherein said powder is a lining material.

(52) A granulated product-making method as recited in any one of (1) to (18), wherein said powder is a material for vent holes.

(53) A granulated product-making method as recited in any one of (1) to (18), wherein said powder is a soil material.

(54) A granulated product-making method as recited in any one of (1) to (18), wherein said powder is a bio-material or a bio-ceramic material.

(55) A granulated product-making method as recited in any one of (1) to (18), wherein said powder is a material for slopes.

(56) A granulated product-making method as recited in any one of (1) to (18), wherein said powder is an apatite material.

(57) A granulated product-making method as recited in any one of (1) to (18), wherein said powder is a material having delayed action.

(58) A granulated product-making method as recited in any one of (1) to (18), wherein said powder is a plastic material.

(59) A granulated product-making method as recited in any one of (1) to (18), wherein said powder is a photosensitive material.

(60) A granulated product-making method as recited in any one of (1) to (18), wherein said powder is a hydrogen occluding material.

(61) A granulated product-making method as recited in any one of (1) to (18), wherein said powder is a material for musical instruments.

(62) A granulated product-making method as recited in any one of (1) to (18), wherein said powder is an acoustic or speaker material.

(63) A granulated product-making method as recited in any one of (1) to (18), wherein said powder is an ozone-decomposing material.

(64) A granulated product-making method as recited in any one of (1) to (18), wherein said powder is a porcelain enamel material.

(65) A granulated product-making method as recited in any one of (1) to (18), wherein said powder is a glazing material.

(66) A granulated product-making method as recited in any one of (1) to (18), wherein said powder is an aerospace material.

(67) A granulated product-making method as recited in any one of (1) to (18), wherein said powder is a material for solar furnaces.

(68) A granulated product-making method as recited in any one of (1) to (18), wherein said powder is an artificial dental material.

(69) A granulated product-making method as recited in any one of (1) to (18), wherein said powder is a tile material.

(70) A granulated product-making method as recited in any one of (1) to (18), wherein said powder is a pigment material.

(71) A granulated product-making method as recited in any one of (1) to (18), wherein said powder is a filler material.

(72) A granulated product-making method as recited in any one of (1) to (18), wherein said powder is a main adhesive component material.

(73) A granulated product-making method as recited in any one of (1) to (18), wherein said powder is an ultrafine particle material.

(74) A granulated product-making method as recited in any one of (1) to (18), wherein said powder is a permanent magnet material.

(75) A granulated product-making method as recited in any one of (1) to (18), wherein said powder is a shape-memory material.

(76) A method of making an agglomerate comprising a multiplicity of granulated products that are agglomerated and bound together, characterized in that a multiplicity of discrete granulated products obtained by the method recited in any one of (1) to (75) are agglomerated and bound together into an agglomerate.

(77) A method of making a sintered agglomerate, characterized in that a multiplicity of discrete granulated products obtained by the method recited in any one of (1) to (75) are sintered into a sintered agglomerate.

(78) A granulated product-making method as recited in any one of (1) to (18), wherein a plurality of different layers are coated on a granulated product to obtain a granulated product comprising a spherical, multilayered solid shell.

(79) An agglomerate-making method, characterized in that a multiplicity of discrete granulated products as recited in (78) are agglomerated and bound together into an agglomerate.

(80) A sintered agglomerate-making method, characterized in that a multiplicity of discrete granulated products as recited in (78) are agglomerated and bound together into a sintered agglomerate.

(81) A granulated product-making method as recited in (1) to (80), wherein said granulated product is at least one member selected from the group consisting of (1) a pharmaceutical substance, (2) a fertilizer, (3) foodstuff, (4) cement, (5) feed, (6) a coloring material, (7) agricultural chemicals, (8) a cosmetic material, (9) an enzyme-containing material, (10) a surfactant, (11) a semiconductor, (12) a metal, (13) a multi-capsulated structure, (14) cermet, (15) a paint coating material, (16) a filtering material, (17) a heat-insulating material, (18) a sound-absorbing material, (19) an electric wave-absorbing material, (20) a light-absorbing material, (21) a reflecting material, (22) a sign-posting material, (23) a ball bearing, (24) a bio-reactor, (25) a far infrared ray-radiating material, (26) an electric heating material, (27) a light-weight aggregate, (28) a material for ball games, (29) a dehumidifying material, (30) a furnace material, (31) a material for engine room walls, (32) a material for gas turbine room walls, (33) a lining material, (34) a material for vent holes, (35) a soil material, (36) a bio-material or bio-ceramics, (37) a material for slopes, (38) an apatite material, (39) a material having delayed action, (40) a plastic material, (41) a photosensitive material, (42) an hydrogen occluding material, (43) a material for musical instruments, (44) an acoustic material, (45) an ozone-decomposing material, (46) a porcelain enamel material, (47) a glazing material, (48) an aerospace material, (49) a solar furnace material, (50) an artificial dental material, (51) a tile material, (52) a pigment, (53) a filler material, (54) a main adhesive component material, (55) an ultrafine particle material, (56) a permanent magnet material, and (57) a shape-memory material.

(82) A method of making a granulated product as recited in any one of (1) to (81), characterized by allowing a polymer particle having high water absorption properties to be swollen by absorption of water therein, depositing a first powder layer on a surface of said polymer particle, depositing one or more powder layers on said first powder layer, and drying a multilayered structure to obtain a granulated spherical product of the multilayered structure having a spherical space therein.

(83) A method of making a granulated product as recited in any one of (1) to (81), characterized by allowing a polymer particle having high water absorption properties to be swollen by absorption of water therein, depositing a first powder layer on a surface of said polymer particle, depositing one or more powder layers on said first powder layer, and drying and firing a multilayered structure to obtain a granulated spherical product of the multilayered structure having a spherical space therein.

(84) A granulated product-making method as recited in (1) to (83), characterized by depositing a powder mixture comprising two or more different powders on a surface of a polymer particle having high water absorption properties, said polymer particle being swollen by absorption of water therein, followed by drying, thereby obtaining a granulated product comprising a spherical solid shell that is formed by binding said different powders together and has a spherical space therein.

(85) A granulated product-making method as recited in (1) to (83), characterized by depositing a powder mixture comprising two or more different powders on a surface of a polymer particle having high water absorption properties, said polymer particle being swollen by absorption of water therein, followed by drying and firing, thereby obtaining a granulated product comprising a spherical solid shell that is formed by binding said different powders together and has a spherical space therein.

(86) A granulated product-making method as recited in any one of (1) to (85), characterized by depositing a binder on a surface of a polymer particle having high water absorption properties, said polymer particle being swollen by absorption of water therein, and depositing a powder on a surface of said binder, followed by drying, thereby obtaining a granulated product comprising a spherical solid shell and having a spherical space therein.

(87) A granulated product-making method as recited in any one of (1) to (85), characterized by depositing a binder on a surface of a polymer particle having high water absorption properties, said polymer particle being swollen by absorption of water therein, and depositing a powder on a surface of said binder, followed by drying and firing, thereby obtaining a granulated product comprising a spherical solid shell and having a spherical space therein.

BRIEF DESCRIPTION OF THE DRAWINGS

The present invention will be further described in conjunction with the accompanying drawings, in which.

BEST MODE FOR CARRYING OUT THE INVENTION

Figure 1:
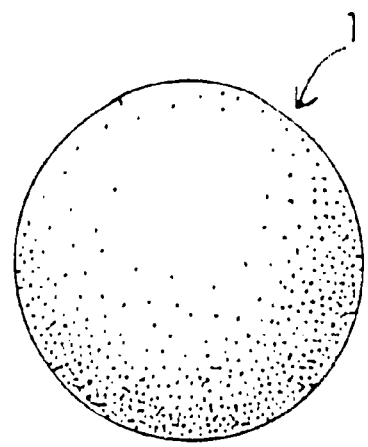
FIG. 1 is a front schematic illustrative of one configuration of spherical granulated products obtained in the examples of the invention.

According to the present invention, the polymer particle having high water absorption properties is used. This polymer particle is swollen by the absorption of water therein, and then brought into contact with a powder to form a powder layer all over the surface of the swollen polymer particle, followed by drying. In this way, a granulated hollow product having any desired particle size, i.e., a granulated product comprising a spherical solid shell and having a spherical space therein can be easily obtained.

In the practice of the invention, the polymer having high water absorption properties is preferably in a particulate form having a particle size of 0.02 to 3.0 mm. Upon immersion in water for water absorption and swelling, the polymer provides a small sphere that can have a particle diameter of 0.1 to 60.0 mm, and preferably 0.2 to 10 mm. Particle size separation may be carried out by means of a JIS standard sieve, so that the size of the spherical space surrounded by the spherical solid shell in the granulated product can be simply adjusted as desired by the selective use of a polymer (having high water absorption properties) having an appropriate particle size.

For the polymer having high water absorption properties, it is preferable to use a polymer having a three-dimensional network structure having a slight degree of crosslinkage introduced into a water-soluble electrolyte polymer having an ionic group. For instance, it is preferable to use polyacrylic acid salt polymers, saponified vinyl acetateacrylate copolymers, and starch-acrylic acid graft polymers. More specifically, it is preferable to use hydrolyzates of starch-acrylonitrile graft copolymers, neutralized products of starch-acrylic acid graft copolymers. saponified products of acrylic ester-vinyl acetate copolymers, polyvinyl alcohols modified by crosslinking, crosslinked products of partially neutralized polyacrylic acid salts, crosslinked isobutylenemaleic anhydride copolymers, crosslinked products of maleic anhydride grafted polyvinyl alcohols, and ethylene-vinyl alcohol polymers. The polymer having high water absorption properties may have been uniformly crosslinked, or crosslinked on its surface alone. Polymers having high water absorption properties, for instance, are disclosed in JP-B's 49-43395, 53-46199, 55-21041, 53-13495, 55-19243 and 60-25045, and JP-A's 54-20093, 55-84304, 56-91837, 56-93716, 56-161408, 58-71907, 56-36504, 57-21405, 61-87702, 61-157513, 62-62807 and 2-49002. Examples of processed polymers are, on the other hand, disclosed in JP-A's 58-180233, 58-117222 and 58-42602.

In the polymer (having high water absorption properties) swollen by the absorption of water therein, the ratio of the polymer (having high water absorption properties) to water is preferably in the range of 1:50 to 1:500.

The polymer particle (having high water absorption properties) swollen by the absorption of water therein is brought into contact with the powder to form a powder layer on the surface of the polymer particle (having high water absorption properties). This process may generally be carried out by tumbling the polymer (having high water absorption properties) having a suitable size on the powder spread over a sheet to cover the powder uniformly on the surface of the polymer having high water absorption properties. However, any process substantially equivalent to the aforesaid process may be used without restriction. By the term "any process substantially equivalent to the aforesaid process" are intended processes that enable a powder layer to be formed on the surface of the polymer having high water absorption properties. The thickness of the powder layer may be determined depending on the type of powder used, and the properties required for the end granulated product. In this process, the powder is usually used in an amount large enough to provide a sufficient cover the surface of the polymer having high water absorption properties.

For drying, a suitable process may be selected from ordinary drying processes. However, it is preferable to use infrared rays, and microwaves.

High-frequency dielectric heating is preferably carried out at a frequency of about 2,450 MHz and a power of 180 to 600 W for a dielectric heating time of 10 minutes to 60 minutes. The high-frequency dielectric heating systems used include a batch system, a roller conveyor system, a reduced pressure drying system, and a high electric field wave guide type drying system. A typical high-frequency dielectric heating system is made and sold by Toshiba Mechatronics Co. Ltd., while a typical infrared drying/heating system is made and sold by Hitachi Ltd., and Toshiba Corporation.

More preferably, the spherical form of granulated hollow product dried by high-frequency dielectric heating is fired in a firing furnace into a sintered agglomerate. Upon drying, the spherical form of granulated hollow product may be further dried at low temperatures, dried at higher temperatures, fired at low temperatures, or molten and fired at higher temperatures.

The powder used herein may be an organic material and/or an inorganic material. The powder may additionally contain a binder. The binder may be selected from those known in the art depending on the type of powder used, although not limited thereto.

The ceramic raw material used herein is preferably a mixture of a binder and at least one member selected from the group consisting of clay, a clay mineral, chamotte, silica sand, steatite, feldspar, alumina, magnesia, mullite, zirconia, silica, cordierite, ferrite, apatite, blast-furnace slag, shirasu, fly ash, silicon carbide, aluminum nitride, and silicon nitride. Any of known or improved ceramic raw materials or ceramics may be used although not limited thereto.

The ceramic raw powder used has preferably a particle size of a few $\mu$m to several hundred $\mu$m, but it is acceptable to use an ultrafine form of powder.

It is also preferable to use any of ceramic raw powder that can be sintered at high temperatures. For instance, a ceramic raw powder that can usually be sintered at 1,000 to 2,000° C. is preferably used.

For the member or members selected from the group consisting of (1) a pharmaceutical substance, (2) a fertilizer, (3) foodstuff, (4) cement, (5) feed, (6) a coloring material, (7) agricultural chemicals, (8) a cosmetic material, (9) an enzyme-containing material, (10) a surfactant, (11) a semiconductor, (12) a metal, (13) a multi-capsulated structure, (14) cermet, (15) a paint coating material, (16) a filtering material, (17) a heat-insulating material, (18) a sound-absorbing material, (19) an electric wave-absorbing material, (20) a light-absorbing material, (21) a reflecting material, (22) a signposting material, (23) a ball bearing, (24) a bio-reactor, (25) a far infrared ray-radiating material, (26) an electric heating material, (27) a light-weight aggregate, (28) a material for ball games, (29) a de-humidifying material, (30) a furnace material, (31) a material for engine room walls, (32) a material for gas turbine room walls, (33) a lining material, (34) a material for bent holes, (35) a soil material, (36) a bio-material or bio-ceramics, (37) a material for slopes, (38) an apatite material, (39) a material having delayed action, (40) a plastic material, (41) a photosensitive material, (42) an hydrogen occluding material, (43) a material for musical instruments, (44) an acoustic or speaker material, (45) an ozone-decomposing material, (46) a porcelain enamel material, (47) a glazing material, (48) an aerospace material, (49) a solar furnace material, (50) an artificial dental material, (51) a tile material, (52) a pigment, (53) a filler material, (54) a main adhesive component material, (55) an ultrafine particle material, (56) a permanent magnet material, and (57) a shape-memory material, any of known or improved materials may be used although not limited thereto.

By the term "pharmaceutical material or substance" used herein are intended drugs for the central nervous system, drugs for allergic diseases (antihistamine), drugs for the circulatory organs, drugs for the respiratory organs, drugs for the digestive organs, hormone agents, drugs for metabolic disorders, antitumor substances, antibiotic substances, chemotherapeutic agents, and narcotics. The drugs for the central nervous system, for instance, include general anesthetics, soporifics/sedatives, antiepileptics, antipyretics/sedatives/antiphlogistics, drugs for psychoneurosis, drugs for the peripheral nervous system, local anesthetics, skeletal muscle relaxants, drugs for the autonomic nervous system, and spasmolytics. The drugs for the circulatory organs, for instance, include cardiacs, drugs for arrhythmia, diuretics, hypotensive drugs, vasodilating (hypertensive) drugs, angiodilatatorics, drugs for arteriosclerosis, and brain metabolism improvers. The drugs for the respiratory organs, for instance, include cough remedies, sputum removers, and bronchodilators. The drugs for the digestive organs, for instance, include drugs for peptic ulcers, digestives, antiacids, cholagogs, drugs for intestinal disorders, and antemetics. The hormone drugs, for instance, include pituitary body hormone drugs, thyroid hormones, antithyroid drugs, protein assimilation steroid drugs, adrenal cortical hormone drugs, androgen drugs, and female sex hormone drugs (estrogen drugs, luteal hormone drugs, etc.). The drugs for metabolic disorders, for instance, include vitamin drugs, drugs for bloods and body fluids, and drugs for treating gout and diabetes. The antibiotic drugs, for instance, include penicillin, cephalosporin, aminoglycosides, macrolides, tetracyclines, chloramphenicols, antimycotic antibiotics, and antitumor antibiotics. The chemotherapeutic agents, for instance, include sulfa agents, tuberculostats, and virucides.

By the term "fertilizer" used herein are intended potash fertilizers (for instance, naturally occurring potassium salts or potassium ores, potassium chloride, and potassium ulfate), lime fertilizers, magnesia fertilizers, magnesia ime fertilizers, lime silicate fertilizers, calcium silicate fertilizers, nitrogen fertilizers (e.g., ammonia fertilizers such as ammonium chloride, ammonium sulfate, ammonium nitrate, and ammonium carbonate, sodium nitrate, lime nitrate, potassium nitrate, and lime nitrogen), urea-fertilizers (e.g., nitrogen fertilizers having delayed action such as urea, urea-form, isobutylidenediurea, crotonylidene-diurea, urea-Z, glycolurea (acetyleneurea), guanylurea, oxamide, difurfurylidenetriurea, and nitric acid compound inhibitors such as thiourea, and dicyanamide), phosphatic fertilizers (e.g., superphosphate of lime, superphosphate of magnesia, double superphosphate of lime, precipitated phosphate of lime, by-produced phosphate fertilizer, fused phosphate fertilizers such as fused phosphate of magnesia, calcined phosphate fertilizers such as defluorinated calcined tricalcium phosphate, and Thomas phosphatic fertilizer), organic fertilizers (e.g., fish lees powders, bone powders, and vegetable oil lees powders), lime fertilizers (e.g., calcium carbonate, slaked lime, and quick lime), silicate fertilizers (e.g., slags such as calcium silicate fertilizer), magnesia fertilizers (e.g., magnesium sulfate, and magnesium hydroxide), manganese fertilizers (e.g., manganese sulfate), compound fertilizers (e.g., mixed fertilizers such as normal mixed fertilizer, urea-mixed fertilizer, and basic mixed fertilizer, and compound fertilizers such as low-grade compound fertilize, and high-grade compound fertilizer), trace element-mixed fertilizer, fertilizers containing agricultural chemicals and other substances, and fertilizers containing soil improvers.

By the term "foodstuff" used herein are intended cereals, potatoes and starches, sugar and sweeteners, oils and fats, beans, fishery products, flesh of animals, birds and whales, eggs, vegetables, fruits, mushrooms, seaweed, and table luxuries. The oils and fats are broken down into vegetable oils and fats, and animal oils and fats, the former including soybean oil, rape seed oil, rice oil, cotton seed oil, sesame oil, sunflower oil, mustard oil, corn oil, safflower oil, olive oil, palm oil, and peanut oil, and the latter including those obtainable from cattle, swine and domestic fowls, creams obtainable from milk and goat milk, herring oil, sardine oil, mackerel oil, mackerel pike oil, and whale oil.

Saccharides such as sugar includes naturally occurring sweeteners such as sucrose, glucose, fructose, maltose, lactose and honey, starch syrup, powder wheat gluten, purified glucose, industrially obtainable starch sugars such as isomerized sugar, and sugar-alcohols such as mannitol.

The starches, for instance, include those obtainable from corns, potatoes, sugarcanes, cassava, wheat and sago palm, dextrin, denatured starch, amylose, pectin, esterified starch, etherified starch, crosslinked starch, and α-starch.

The foodstuffs, for instance, include amino acid, peptide, protein, nucleic acids, protein hydrolyzates, savory peptide, bitter peptide, sweet peptide, spice, organic acids, vegetable colors, animal colors, and synthetic colors as well as food additives such as flavorings, sweeteners, perfumes, coloring matters, oxidation preventives, coloring preventives, emulsifiers, adhesive pastes, preservatives, and bleachers.

The cements, for instance, include self-hardening cements, potentially hydraulic cements, blended cements, polymer cements, and resin cements. The self-hardening cements, for instance, include portland cements such as normal portland cement, high early strength portland cement, super high early strength portland cement, moderate heat portland cement, sulfate resistive portland cement, and white portland cement, alumina cements, fast-hardening high strength cement, expansive cement, acidic phosphate cement, colloid cement, and calcined gypsum. The potentially hydraulic cements, for instance, include lime slag cement, portland blast-furnace cement, high sulfate slag cement, and Keen's cement. The blended cements, for instance, include lime silica cement, silica cement, lime silicate blended cement, sodium or potassium silicate cement, water glass, oxychloride cement, and phosphate cement.

The cements may further contain various admixtures such as air-entraining agents, water-reduction promoters, water-reduction delaying agent, water reducers such as air-entraining water reducers, high-performance water reducers, delaying agents, promoters, fast-hardening agents, water-proofing agents, foaming agents, defoaming agents, viscosity increasers, water-retaining agents, rust preventives, hydration heat reducers, and surface active agents. The delaying agents, for instance, include saccharides, oxycarboxylates, polyhydroxy compounds, lignin sulfonates, and silicofluorides.

The polymer cements, for instance, include rubber latex (styrene-butadiene rubber) cement, thermoplastic resin emulsion (ethylene-vinyl acetate) cement, and acrylic (polyacrylic ester) cement. The resin cements, for instance, include those comprising thermosetting unsaturated polyester resin, epoxy resin, furan resin, urethane resin, acrylic ester, and methacrylic ester.

By the term "feed" used herein are intended feeds for livestock, feeds for pets (e.g., dogs, cats, aquarium fishes, small birds, racing horses, and animals at zoos), and those for fish breeding. The raw materials for such feeds are those of vegetable origin such as cereals, beans, potatoes, oil cakes, rice bran, and oil cake products, those of animal origin such as fish meal, white fish meal, fish solubles, meat powders, bone powders, feather meal, sericultural oil cakes, skim milk, dry whey, and animal oils and fats, brewer's yeast, torula yeast, screening pellets, alfalfa meal, orange peel, calcium carbonate, sodium chloride, dicalcium ortho-phosphate, and tricalcium ortho-phosphate.

The feeds may further contain various vitamin preparations, various amino acids, minerals, antibiotic substances, antibacterial substances, enzymes, mold preventives, antioxidants, pigment-reinforcing agents, sweeteners, perfumes, and hormones.

The term "feed" used herein is also understood to refer to blended feeds for domestic fowls (e.g., chicks, broilers, grown chickens, and capons), feeds for swine (e.g., young pigs, porkers, and boars), feeds for cattle (e.g., feeds for breeding dairy cows, calves, and beef cattle), feeds for turkeys, feeds for quails, feeds for breeding fishes such as eels, carps, sweetfishes, red sea breams, and young yellowtails, and feeds for breeding experimental animals.

By the term "agricultural chemicals" used herein are intended bactericides, insecticides, a combined bactericide and insecticide, rodenticides, herbicides, plant growth regulators, attracting agents, repellents, chemically abortive agents, and auxiliary agents.

By the term "agricultural chemicals" are also intended inorganic compounds such as copper compounds, mercury compounds, zinc compounds, iron compounds, sulfur compounds, arsenic compounds, fluorine compounds, phosphorus compounds, chlorine compounds, calcium compounds, and alkali compounds; organic compounds such as nicotine compounds, pyrethrin compounds, rotenone compounds, machine oil compounds, organic sulfur compounds, organic mercury compounds, organic chlorine compounds, organic phosphorus compounds, organic arsenic compounds, nitro base compounds, phenol base compounds, triazine base compounds, quinone base compounds, and antibiotic substances; and microorganisms and toxins produced therefrom.

The insecticides, for instance, include organic phosphorus base insecticides such as pyrethrins (naturally occurring pyrethrin, synthetic pyrethroid and its derivatives), rotenones, nicotine, nornicotine, nerainutoxin (sic), parathion, malathion, diazinon, trichlorfon (sic), phenthrothion (sic), TEPP, acefate (sic), chlorpyrifos (sic), salythion (sic), dichlorbos (sic), fention (sic), fenthoate (sic), methidathion (sic), EPN, disulfoton (sic), and methyl parathion; carbamate base insecticides such as MIPC, MTMC, MPMC, carbaryl (sic), BPMC, and propoxer (sic); organic chlorine base insecticides such as DDT, BHC, aldrin, dieldrin, heptachlor, endrin and chlordane; tick killers represented by dinitrophenol base tick killers, and chlorophenyl base tick killers (e.g., chlorobenzilate, CPCBS, dichohol (sic), and bromopylate (sic); other tick killers; arsenic compounds; and nematocides.

The bactericides, for instance, include antibiotic substances, heavy metal base bactericides (e.g., copper-containing compounds such as bordeaux mixtures, organic mercury compounds, organic tin compounds, and organic arsenic compounds), sulfur base bactericides (e.g., inorganic sulfur compounds, dithiocarbamate base bactericides, and organic arsenic compounds), organic phosphorus base bactericides, aromatic bactericides (e.g., PCP, DDC, PCNB, Dichlone and TPN), and heterocyclic compound bactericides (e.g., captan, triazine, quinomethionate (sic), benomyl (sic), phthalide, phenazine, and hydroxyisooxazole).

The herbicides, for instance, include phenoxy base herbicides, phenol base herbicides, diphenylether base herbicides, aniline base herbicides, urea base herbicides, carbamate base herbicides, amide base herbicides, nitrile base herbicides, bipyridium base herbicides, triazine base herbicides, fatty acid base herbicides, and diazine base herbicides.

By the term "cosmetic material" used herein are intended fundamental cosmetics, makeup cosmetics, medicated cosmetics, hair-care cosmetics, mouth-care cosmetics, toilet cosmetics, aromatics, and perfumes. The fundamental cosmetics, for instance, include creams, milky lotions, and toilet water. The makeup cosmetics, for instance, include toilet powder, rouge, nail enamel, mascara, and eye shadow. The medicated cosmetics, for instance, include anti-suntan products, suntan products, and deodorant cosmetics.

The hair-care cosmetics, for instance, include shampoos, cold wave lotions, hair dyes, pomade, and hair liquids, and the mouth-care cosmetics, for instance, include dentifrice, mouth cleaners, and mouth deodorants.

By the term "surfactant" used herein are intended anionic, cationic, nonionic, amphoteric, and other surfactants.

The anionic surfactant, for instance, includes soap, Turkey red oil, sulfuric ester salt, alkylbenzenesulfonate, α-olefin sulfonate, N-acylamino acid salt, dialkyl Z-sulfosuccinate, and N-(Z-sulfo)ethyl-N-methylalkane amide salt.

The cationic surfactant, for instance, includes alkyl trimethylammonium chloride, dialkyl dimethylammonium chloride, alkylpyridinium bromide, and alkylbenzyl dimethylammonium chloride.

The nonionic surfactant, for instance, includes alkyl polyoxyethylene ether, alkylphenyl polyoxyethylene ether, alkylcarbonyloxy polyoxyether, N,N-di(polyoxyethylene)alkane-amide, fatty acid polyhydric alcohol ester, fatty acid polyhydric alcohol polyoxyethylene ether, fatty acid sucrose ester, N,N-di(alkanol)alkane amide, and polyoxyalkylene block copolymer.

Surfactants are now used in various preparation forms such as detergents, wetting agents, penetrating agents, dispersants, flocculants, emulsifiers, emulsion breakers, solubilizers, foaming agents, defoaming agents, smooth finish agents, lubricants, softeners, antistatics, water repellants, germicides, and rust preventives. The granulated product of the present invention, too, are thus expected to have such applications.

By the term "paint" used herein are intended synthetic resin paints, oil paints, spirit paints, inorganic paints, etc. The synthetic resin used for synthetic resin paints, etc. includes thermoplastic resin, thermosetting resin, and the like. The thermoplastic resin, for instance, includes acrylic resin, e.g., thermoplastic acrylic resin; halogenated vinyl resin, e.g., vinyl chloride-vinyl acetate copolymer resin, and fluorinated vinylidene resin; polyolefin resin, e.g., chlorinated polypropylene; polyvinyl alcohol resin, e.g., polyvinyl alcohol, and polyvinyl acetal-butyral; vinyl acetate resin; emulsion resin, e.g., styrene-butadiene resin; high-molecular polyester; and nylon. The thermosetting resin, for instance, includes alkyd, epoxy resin, unsaturated polyester, thermosetting acrylic resin, melamine resin, urea resin, urethane prepolymers, silicone intermediates, phenol resin, xylene resin, maleic resin, polybutadiene, and petroleum resin.

In the practice of the present invention, known or improved semiconductors may be used although not limited thereto. For instance, use may be made of any one of individual semiconductors, binary alloy compound semiconductors comprising combinations of two elements, and multi-alloy compound semiconductors comprising combinations of three or more elements (e.g. II–IV–V elements, III elements, V elements, and VII elements). More specifically, use may be made of combinations comprising IV elements such as Si, Ge, and Sn, and IV—IV elements such as SiC; and combinations comprising VI elements such as Se, and Te, and III–V elements (e.g., BP, AlP, AlAs, AlSb, GaN, GaP, GaAs, GaSb, InP, InAs, and InSb), II–VI elements (e.g., ZnO, ZnS, ZnSe, ZnTe, CdS, CdSe, CdTe, HgS, HgSe, and HgTe), and IV–VI elements (e.g., PbS, PbSe, PbTe, and SnTe). The semiconductors are fabricated by suitable processes such as diffusion, ion implantation, and epitaxial growth, and may be doped with impurities, if necessary.

By the term "cermet" used herein is intended oxide cermet, carbide cermet, boride cermet, nitride cermet, and so on. ceramics components of cermet, for instance, may be TiC, WC, $Cr_3C_2$, $Al_2O_3$, and $SiO_2$, although not limited thereto. In the practice of the present invention, however, components known for ceramics are all available. Metals used for cermet, although not critical, may be Ni, Mo, Fe, Cr, Co, Ag, Cu, and Sn. Various metal oxides such as CdO, ZnO and $SnO_2$, too, may be used in the practice of the present invention.

The granulated ceramic product preferably obtained according to the present invention comprises a spherical ceramic shell and has a spherical space therein. This is obtained by allowing the polymer particle having high water absorption properties to be swollen by the absorption of water therein, and bringing the swollen polymer particle into contact with the ceramic raw powder to form a ceramic raw powder layer all over the surface of the swollen polymer particle, followed by drying, and firing.

For the purpose of retaining the shape and strength of the ceramic raw powder upon shaping, drying and firing, it is preferable to incorporate therein a low-temperature binder for shape and strength retention at low temperatures, e.g., carboxymethylcellulose, starch, and water glass and/or a high-temperature binder for shape and strength retention upon firing, e.g., glazing frit, calcium fluoride, and glass frit.

It is here noted that the binder is not always needed; the ceramic raw powder may be sintered without any binder.

Sintering is preferably carried out at a temperature suitable therefor, thereby bringing powder particles into point contact with one another so that they are agglomerated or bound together. Consequently, the sintered spherical ceramic shell provides a shell wall 11 of a porous or open-pore structure. Communication of gas or liquid between an internal spherical space 10 and the outside is thus achievable through the porous spherical shell wall 11.

Usually, these fine open-pores allow slow passage of gas or liquid to produce various functions and effects, and so make it possible to provide products for various purposes.

For instance, the gas filled in the internal spherical space, e.g., sterilizing or chlorine gas or reactive gas, is slowly released through the porous shell wall.

Similarly, the liquid filled in the internal spherical space, e.g., perfume, a pH adjuster such as an alkali or acid solution, a sterilizing solution, a metal salt solution or an organic solvent is slowly released through the porous shell wall.

This is also true of solids filled in the internal spherical space, e.g., camphor, solid perfume, wax or fertilizer solids; that is, they are slowly released through the porous shell wall. When, for instance, the fertilizer filled in the present granulated product is buried in the ground, it has sustained fertilizer activity because it is slowly released into soil upon penetration of rainwater, etc.

It is understood that the introduction of liquid, gas, or the like into the internal spherical space, for instance, may be easily achieved by placing the present granulated product in a vacuum chamber to produce a vacuum therein, and returning the ambient pressure back to normal pressure while the granulated product is surrounded therearound with liquid or gas. Likewise, the introduction of solids may be easily achieved by placing the present granulated product in a vacuum chamber, and returning the ambient pressure back to normal pressure while the granulated product is surrounded therearound with wax or a metal such as aluminum or tin put into a molten or fused state by heating at high temperatures, followed by cooling.

Preferably, the spherical form of granulated ceramic product comprises a shell containing finely divided solids.

Preferable embodiments of the granulated product according to the present invention will now be described.

The granulated ceramic product of the present invention may be used as a catalyst for the decomposition of automotive exhaust gases if a catalytic substance such as vanadium oxide, platinum, manganese oxide or silver is carried thereon.

The granulated ceramic product of the present invention may be filled therein with an admixture for cement mortar or concrete such as high-performance water reducers, and rust preventives.

The granulated ceramic product of the present invention may be used as a lightweight aggregate, and a soil improver. Furthermore, the granulated ceramic product of the present invention may be used as a light-emitting product in which a light-emitting material is contained in the spherical space and/or shell thereof; as a phosphorescent product in which a phosphorescent material is contained in the spherical space and/or shell thereof; as a sublimable substance releasing product in which a sublimable substance such as iodine, mercury or camphor is contained in the spherical space and/or shell thereof, as a slow releasing product for perfume in which perfume is contained in the spherical space and/or shell thereof; as an enzyme-containing product in which an enzyme such as proteolytic enzyme or amyloclastic enzyme is contained in the spherical space and/or shell thereof; as a bacteria-containing product in which various bacteria and microbes are contained in the spherical space and/or shell thereof; and a bactericide-containing product in which pesticides are contained in the spherical space and/or shell thereof.

The granulated ceramic product of the present invention may also be used as a filter product. For instance, the granulated ceramic product is filled in a network container to form a filter layer through which the gas, liquid or solid suspension to be filtered is treated.

If, in this case, the granulated ceramic product with a catalyst carried thereon is used as a filter material, it is then possible to make clean gaseous pollutants such as $SO_X$ and $NO_X$ as well as a fine dust-containing gas such as cigarette smoke.

The granulated ceramic product of the present invention, composed mainly of alumina, thoria, magnesia, zirconia or the like and so improved in heat resistance, provides a useful heat-resistant structural material or the like. The granulated ceramic product of the present invention, composed mainly of carbon, silicon carbide, boron nitride, aluminum nitride, sialon, mullite, cordierite, aluminum titanate or the like and so improved in corrosion resistance, provides a useful structural or electronic part material, etc. The granulated ceramic product of the present invention, composed mainly of potassium titanate fibers, porous calcium carbonate, mullite fibers, alumina fibers or the like and so improved in heat resistance, provides a useful heat-resistant or non-combustible material, etc. The granulated ceramic product of the present invention, composed mainly of beryllia, diamond, silicon carbide, aluminum nitride, boron nitride or the like and so improved in heat conductivity, provides a useful heat-releasing material, etc.

The granulated ceramic product of the present invention, composed mainly of alumina, diamond, cubic boron nitride, boron carbide, tungsten carbide, titanium carbide, silicon carbide, titanium nitride, titanium boride, zirconium boride or the like and so improved in hardness and wear resistance, is useful for abrasive materials, grinding materials, cutting materials, wear-resistant materials, etc. The granulated ceramic product of the present invention, composed mainly of silicon carbide, silicon nitride, PSZ, alumina or the like and so improved in high strength characteristics, is useful for structural materials, etc. The granulated ceramic product of the present invention, composed mainly of reinforced glass, graphite fibers, whisker or the like and so improved in corrosion resistance, is useful for mechanical part materials, etc.

The granulated ceramic product of the present invention, composed mainly of $Al_2O_3$, BeO, diamond, $Mg_2SiO_4$, $MgSiO_3$, cordierite, SiC, BN, AlN, mullite, $SiO_2$ or the like and so improved in high insulating properties, is useful for ignition plugs for insulators, packaging materials for IC substrates, etc.

Composed primarily of barium titanate, titanate $(Ba_2Ti_9O_{20})$, $(Zr, Sn)Ti_4$, $Pb(Mg, Nb)O_3$, $Ba(Zn, Nb)O_3$ or the like and so improved in ferroelectricity, the granulated ceramic product of the present invention is useful for capacitors, resonators, etc.

Composed primarily of PZT, quartz crystal, $LiTaO_3$, $LiNbO_3$, ZnO, $Bi_{12}GeO_{20}$, $PbTiO_3$, KTN or the like and so improved in piezoelectricity, the granulated ceramic product of the present invention is useful for oscillators, resonator filters, delay elements, ignition elements, piezoelectric transformers, etc.

Composed primarily of PZT, $LiTaO_3$, $PbTiO_3$ or the like and so improved in pyroelectricity, the granulated ceramic product of the present invention is useful for infrared ray sensor elements, etc.

Composed primarily of PLZT, ADP, KDP, $LiTaO_3$, $LiNbO_3$, KTP, $BaB_2O_4$ or the like and so improved in electric polarization, the granulated ceramic product of the present invention is useful for image storage elements, electrooptic polarization elements, etc.

Composed primarily of SiC, $LaCrO_3$, $MoSi_2$, $ZrO_2$, carbon or the like and so improved in resistance heat generation, the granulated ceramic product of the present invention is useful for resistance heating elements, etc.

Composed primarily of manganese-nickel-cobalt base oxides, $ZrO_2$, $TiO_2$, barium titanate solid solutions, vanadium-titanium oxide systems or the like and so improved in resistance temperature performance, the granulated ceramic product of the present invention is useful for thermistors (NTC), heating elements (PTC), temperature elements (CTR), etc.

Composed primarily of zinc oxide-bismuth base materials, SiC or the like and so improved in non-linear resistance performance, the granulated ceramic product of the present invention is useful for voltage stabilizer elements, varistors, etc.

Composed primarily of $SnO_2$, ZnO, $TiO_2$, $ZrO_2$ or the like and so improved in gas resistance, the granulated ceramic product of the present invention is useful for gas sensors, etc.

Composed primarily of materials based on $MgCr_2O_4$—$TiO_2$, $ZnO$—$Li_2O$—$V_2O_5$, $Li_2O$—$Fe_2O_3$ or the like and so improved in humidity resistance, the granulated ceramic product of the present invention is useful for humidity sensors, etc.

Composed primarily of materials based on B-P, B-Y or the like and so improved in thermoelectricity, the granulated ceramic product of the present invention is useful for thermoelectric elements, etc.

Composed primarily of β-alumina, zirconia, NASICON, lithium-containing glass or the like and so improved in ionic conduction, the granulated ceramic product of the present invention is useful for solid electrolytes for batteries, sensors, etc.

Composed primarily of $BaPb_{1-x}Bi_xO_3$, $LiTi_2O_4$, $Pb_xMo_6S_7$, $(La, Ba)_2CuO_4$, $Ba_2YCu_3O_7$, $Bi_2Sr_2Ca_2Cu_3O_8$ or the like and so improved in superconductivity, the granulated ceramic product of the present invention is useful for elements, cables, magnets, etc.

Composed primarily of $BaTiO_3$, $ZnTiO_3$ or the like and so improved in thermionic emission, the granulated ceramic product of the present invention is useful for secondary electron emitter elements, etc.

Composed primarily of $LaB_6$, TiC or the like and so improved in secondary electron emission, the granulated ceramic product of the present invention is useful for hot cathodes, etc.

Composed primarily of $\gamma\text{-}Fe_2O_3$, $Fe_3O_4$, $Ba(Fe, Co, Ti)_{12}O_{19}$, Mn—Zn ferrite, Ni—Zn ferrite, Ni ferrite or the like and so improved in soft magnetism, the granulated ceramic product of the present invention is useful for magnetic tapes, magnetic fluids, magnetic cores, magnetic heads, storage operation elements, magnetostrictive oscillators, etc.

Composed primarily of $SrO.6F_2O_3$, $BaO.6Fe_2O_3$ or the like and so improved in hard magnetism, the granulated ceramic product of the present invention is useful for magnets, etc.

Composed primarily of various ferrites or the like and so improved in radio-wave absorption, the granulated ceramic product of the present invention is useful for radio-wave absorbers.

Composed primarily of $Al_2O_3$, MgO, $Y_2O_3$ or the like and so improved in light transmission, the granulated ceramic product of the present invention is useful for light-transmitting materials resistant to heat and corrosion, etc.

Composed primarily of silica, fluoride glass or the like and so improved in light guidance, the granulated ceramic product of the present invention is useful for light guiding materials, etc.

Composed primarily of $SnO_2$, $In_2O_3$, TiN or the like and so improved in light reflectivity, the granulated ceramic product of the present invention is useful for coating materials for infrared reflecting window glasses, ligh-treflecting solar heat condensers resistant to heat, etc.

Composed primarily of $CaWO_4$, CsI, NaI, LiF, $Ca_{10}(PO_4)_6(F, Cl)_2$, $Y_2O_3$, $BaMg_2Al_{16}O_{27}$, $CeMgAl_{11}O_{19}$, $LaF_3$:Yb, Er, $Y_2O_2S$, ZnO, ZnS, $Zn_2SiO_4$, $Zn_3(PO_4)_2$, $Gd_2O_2S$ or the like and so improved in fluorescence emission, the granulated ceramic product of the present invention is useful for fluorescence emitters excited by X-rays, ultraviolet rays, infrared rays, and power, etc.

Composed primarily of CdS, PbS, InSb, HgCdTe or the like and so improved in photoconductivity and photoelectromotive force, the granulated ceramic product of the present invention is useful for light receptor elements, etc.

Composed primarily of $Al_2O_3$:Cr, YAG:Nd, glass:Nd, $BeAl_2O_4$, GaAs, GaP, GaAsP, GaAlP, GaAlAs or the like and so improved in light emission, the granulated ceramic product of the present invention is useful for lasers, etc.

Composed primarily of GaAlAs, GaInAsP, GaAlAsSb, GaInAs, GaInAsP, GaN, SiC, ZnS or the like and so improved in light emission, the granulated ceramic product of the present invention is useful for light-emitting diodes, etc.

Composed primarily of $BGO(Bi_4Ge_3O_{12})$, NaI or the like and so improved in light emission, the granulated ceramic product of the present invention is useful for radiation-detecting materials, etc.

Composed primarily of ZnS, CaS, SrS, ZnSe or the like and so improved in light emission, the granulated ceramic product of the present invention is useful for electroluminescence materials, etc.

Composed primarily of $BaTiO_3$, $SrTiO_3$, $WO_3$, $MoO_3$, $TiO_2$ or the like and so improved in coloring ability, the granulated ceramic product of the present invention is useful for electrochromic materials, etc.

Composed primarily of $LiTaO_3$, $LiNbO_3$, PLZT, BSO ($Bi_{12}SiO_{20}$), KTN or the like and so improved in electrooptic characteristics, the granulated ceramic product of the present invention is useful for electrooptic modulation elements, etc.

Composed primarily of $LiTaO_3$, $LiNbO_3$, $PbMoO_4$, $TeO_2$ or the like and so improved in acoustooptic characteristics, the granulated ceramic product of the present invention is useful for acoustooptic polarization elements, etc.

Composed primarily of $Y_3Fe_5O_1$, $Gd_2BiFe_5O_{12}$ or the like and so improved in magnetooptic characteristics, the granulated ceramic product of the present invention is useful for magnetooptic recording materials, etc.

Composed primarily of apatite, alumina, carbon or the like and so improved in bio-affinity, the granulated ceramic product of the present invention is useful for artificial bone and dental materials, etc.

Composed primarily of silica, alumina, zeolite or the like and so improved in adsorptivity, the granulated ceramic product of the present invention is useful for immobilized enzyme carriers, etc.

Composed primarily of alumina, cordierite, titania, silica, zeolite, potassium titanate, vanadium oxide or the like and so improved in the ability to provide catalysts and carriers, the granulated ceramic product of the present invention is useful for catalyst carriers, catalysts, etc.

Composed primarily of alumina, zirconia, silicon carbide, boron carbide, boron nitride, silicon nitride, titanium nitride or the like and so improved in corrosion resistance, the granulated ceramic product of the present invention is useful for corrosion resistant materials, etc.

Composed primarily of uranium oxide, uranium carbide or the like and so improved in nuclear performance, the granulated ceramic product of the present invention is useful for nuclear fuels, etc.

Composed primarily of graphite, silicon carbide or the like and so improved in nuclear performance, the granulated ceramic product of the present invention is useful for nuclear fuel cladding materials, etc.

Composed primarily of graphite, boron carbide or the like and so improved in nuclear performance, the granulated ceramic product of the present invention is useful for moderators, reflectors, etc.

Composed primarily of boron carbide or the like and so improved in nuclear performance, the granulated ceramic product of the present invention is useful for controlling materials, etc.

Composed primarily of graphite, silicon carbide, boron carbide, silicon nitride or the like and so improved in nuclear performance, the granulated ceramic product of the present invention is useful for materials for nuclear fusion reactors, etc.

Composed primarily of solid lithium compounds or the like and so improved in nuclear performance, the granulated ceramic product of the present invention is useful for substances having affinity for tritium for nuclear fusion, etc.

Preferable embodiments of the method of making the granulated ceramic product of the present invention will be set out below as (1) to (12):

(1) A granulated ceramic product-making method, characterized by allowing a polymer particle having high water absorption properties to be swollen by absorption of water therein, and bringing the swollen polymer particle in contact with a ceramic raw powder to form a ceramic raw powder layer all over the surface of the swollen polymer particle, followed by drying and firing, thereby obtaining a granulated (hollow) ceramic product comprising a spherical ceramic shell and having a spherical space therein.

(2) A granulated ceramic product-making method, characterized by allowing a polymer particle having high water absorption properties to be swollen by absorption of water therein, and bringing the swollen polymer particle in contact with a ceramic raw powder to form a ceramic raw powder layer all over the surface of the swollen polymer particle, followed by drying, thereby obtaining an unfired, granulated ceramic product comprising a spherical solid shell and having a spherical space therein.

(3) A granulated ceramic product-making method as recited in (1) or (2), wherein said powder contains a normal temperature binder for adhesive materials such as methylcellulose and a high temperature binder such as calcium fluoride, and glass frit.

(4) A granulated ceramic product-making method as recited in any one of (1) to (3), wherein said drying or firing is carried out by dielectric heating in a high-frequency dielectric heating type heater system.

(5) A granulated ceramic product-making method, characterized in that a granulated ceramic product obtained by the method recited in any one of (1) to (4) is immersed in a liquid to impregnate a shell of the granulated ceramic product with the liquid.

(6) A granulated ceramic product-making method as recited in (5), wherein said liquid is a metal salt solution.

(7) A granulated ceramic product-making method, characterized in that a granulated ceramic product obtained by the method recited in any one of (1) to (4) is immersed in a suspension containing a finely divided solid powder such as a finely divided catalyst powder, and dried, thereby obtaining a granulated ceramic product comprising a shell with the finely divided solid powder incorporated therein.

(8) A granulated ceramic product-making method, characterized in that a granulated ceramic product obtained by the method recited in any one of (1) to (7) is immersed in a liquid to obtain a granulated ceramic product (microcapsule) in which the liquid is occluded in a spherical space therein.

(9) A granulated ceramic product-making method, characterized in that a granulated ceramic product obtained by the method recited in any one of (1) to (7) is placed in a gas to obtain a granulated ceramic product in which the gas is occluded in a spherical space therein.

(10) A granulated ceramic product-making method as recited in any one of (1) to (9), wherein said polymer having high water absorption properties is in a spherical powder particle having a particle size of 0.02 to 3.0 mm.

(11) A granulated ceramic product-making method as recited in any one of (1) to (10), wherein said polymer having high water absorption properties is in a small sphere upon swollen by the absorption of water therein, said sphere having a diameter of 0.2 to 60.0 mm.

(12) A granulated ceramic product-making method as recited in any one of (1) to (10), wherein a ratio of said polymer having high water absorption properties upon swollen by the absorption of water therein to the water is in the range of 1:50 to 1:500.

The granulated product of the present invention having a spherical hollow space may be provided in the form of a porous product. If the granulated product is immersed in a liquid, it is then possible to impregnate the shell of the granulated product with the liquid; if the granulated product is immersed in a suspension containing finely divided powders and dried, it is then possible to obtain a granulated product comprising a shell with the finely divided powders incorporated therein; if the granulated product is immersed in a liquid, it is then possible to obtain a granulated product in which the liquid is occluded in a spherical space therein; and if the granulated product is placed in a gas, it is then possible to obtain a granulated product in which the gas is occluded in a spherical space therein. The component impregnated or occluded in the granulated product may be slowly released therefrom. In a preferable embodiment of the present invention, the granulated product is immersed in a metal salt solution.

By sintering the present granulated product having a spherical space therein at higher temperatures as by a melt sintering process, it is possible to vitrify a part or the whole of its spherical shell, thereby obtaining a pore-free product.

Using the snow-ball process, the granulated product obtained by the present invention may be provided on its surface with a layer of the same material or a different material. Alternatively, layers of different powders may be coated on the surface of the granulated product, thereby obtaining a granulated product comprising a multilayered structure of spherical solid shell.

Figure 3:
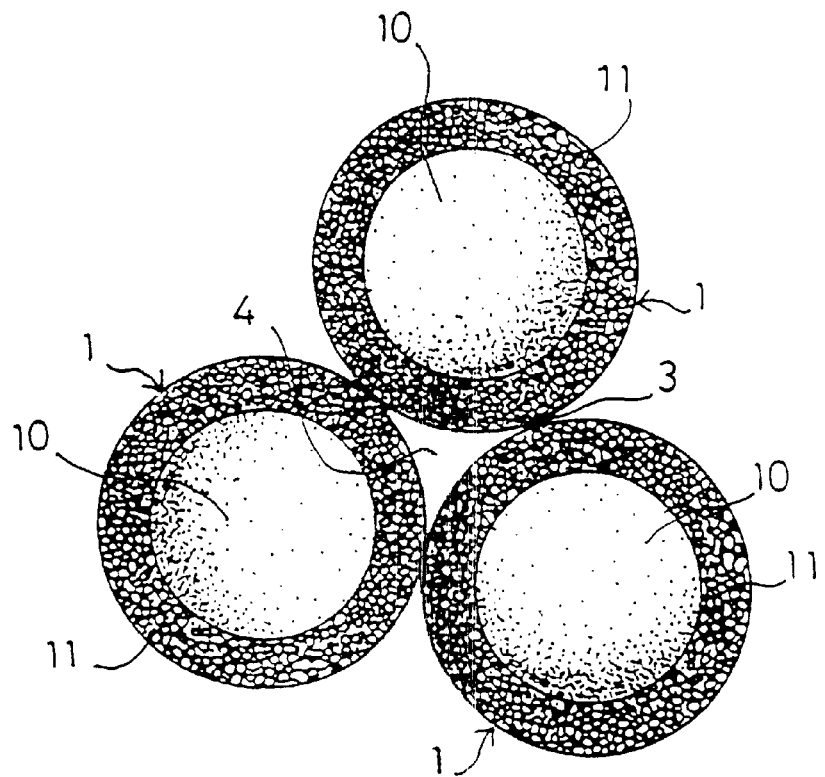
FIG. 3 is a sectional schematic illustrative of one of agglomerates obtained in the examples of the invention, wherein spherical granulated products are bound together in point contacts with one another.
Figure 5:
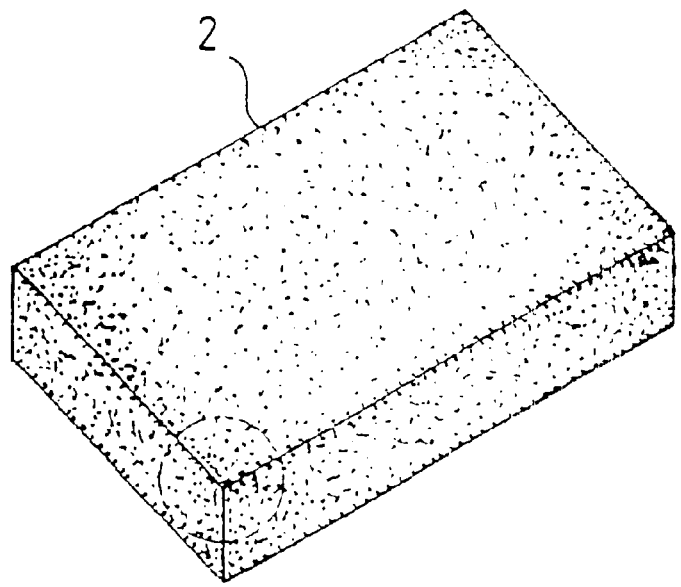
FIG. 5 is a perspective schematic of an agglomerated and bound structure in which a multiplicity of spherical granulated products obtained in the examples of the invention are agglomerated and bound together.
Figure 6:
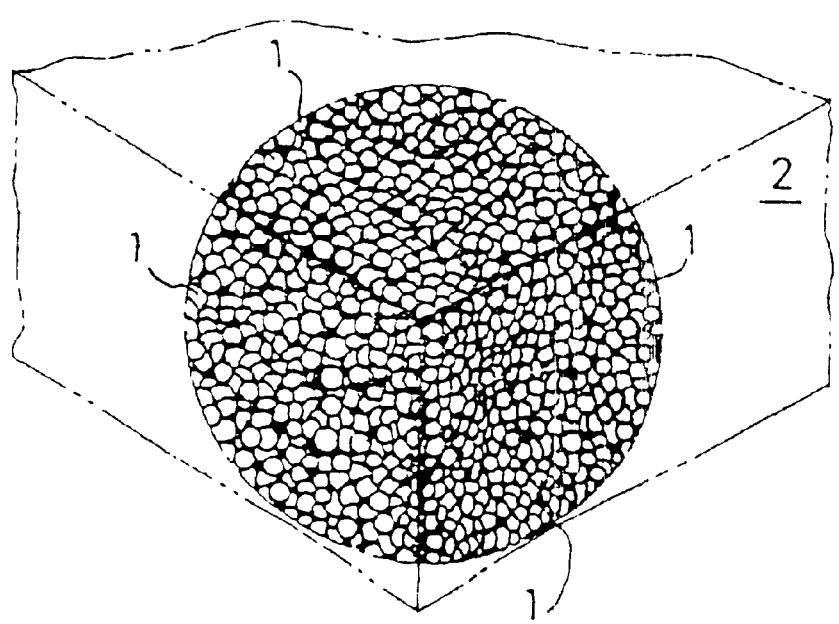
FIG. 6 is an enlarged schematic illustrative of a part of the structure shown in FIG. 5.

A multiplicity of granulated products according to the present invention may be brought into point contact, shown at 3, with one another as shown in FIG. 3, whereby they are agglomerated and bound together into an agglomerate 2 as shown in FIGS. 5, and 6. In this way, the agglomerate 2 comprising a multiplicity of granulated products 1 bound together can be provided. If a multiplicity of granulated products 1 are sintered into a sintered agglomerate 2, it is then possible to obtain a sintered bulk agglomerate in which a multiplicity of granulated products are bounded together by sintering.

In the present invention, it is also possible to obtain a hollow sphere comprising a spherical wall by depositing a binder such as CMC (carboxymethylcellulose) on the surface of the swollen polymer particle (having high water absorption properties), and depositing a powder layer on the surface of the binder, followed by drying. Alternatively, it is possible to obtain a hollow sphere comprising a multilayered spherical wall by depositing a first powder layer on the surface of the swollen polymer particle (having high water absorption properties), and then depositing a second powder layer on the first powder layer, followed by drying. Still alternatively, it is possible to obtain a hollow sphere comprising a spherical wall made up of a bounded agglomerate of different powders by depositing a powder mixture of two or more different powders on the surface of the swollen polymer particle (having high water absorption properties), followed by drying.

Figure 2:
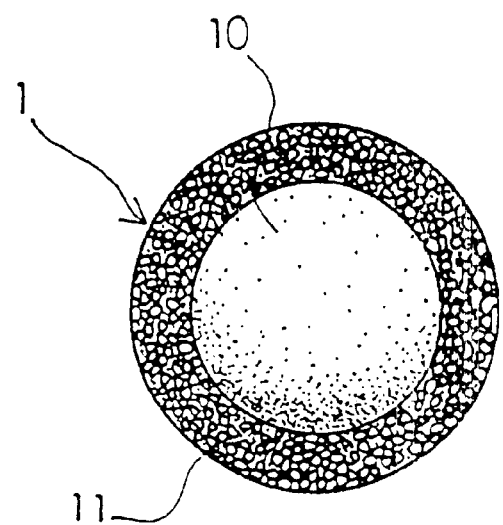
FIG. 2 is a sectional schematic illustrative of one of spherical granulated products obtained in the examples of the invention.

FIG. 1 is a front schematic illustrative of one exemplary outer configuration of a sphere 1 obtained by granulation according to the present invention, and FIG. 2 is a sectional schematic illustrative of the sphere 1 shown in FIG. 1. As can be seen from FIG. 2, a multiplicity of powders are agglomerated into contact points with one another to form a sphere having numerous open pores therein. To obtain such a porous sphere as shown in FIG. 2, it is preferable to use the ceramic raw material in a powder form. In this case, a liquid or gas may be occluded in a central spherical space 10 shown in FIG. 2, or various materials may be impregnated in the sphere 1. Illustrated in FIG. 3 is a schematic illustrative of a typical configuration of three spheres 1 shown in FIGS. 1 and 2, which are bound together into an agglomerate. From FIG. 3 it is found that the spheres 1 are bound together in point contact, shown at 3, with one another to form the agglomerate. It is also found that such an agglomerate has a relatively large void 4 that is defined by the point contacts 3 to provide a communicating passage.

Figure 4:
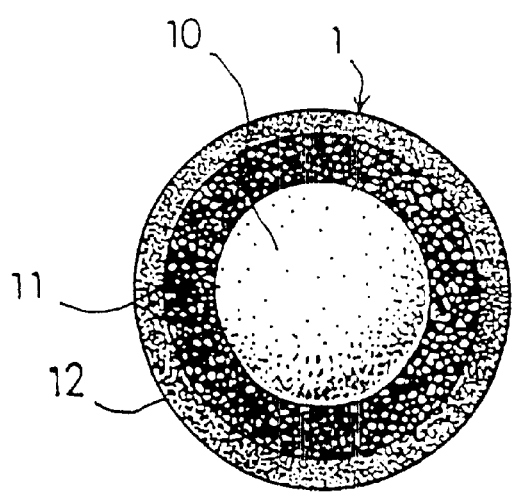
FIG. 4 is a sectional schematic illustrative of one spherical granulated product having a double-layer structure, as obtained in the invention.

FIG. 4 is a sectional schematic illustrative of a sphere 1 obtained by granulation according to the present invention, which comprises a multilayered shell. Although the shell illustrated comprises two layers 11 and 12, it is in principle possible to form a shell of three or more layers. The layers formed may be made up of different materials, the same material, or partially different materials.

Illustrated in FIG. 5 is a structure 2 comprising a multiplicity of spheres 1 obtained by granulation according to the present invention, which are agglomerated and bound together. FIG. 6 illustrates a part of the structure 2 on an enlarged scale. It is found that the structure 2 comprises a multiplicity of agglomerated and bound spheres 1, with a number of open voids 4 formed among them, said open voids providing communicating passages.

Throughout FIGS. 1–6, reference numeral 1 represents a sphere, 2 an agglomerated structure, 3 a point contact, 4 a void, 10 a spherical (hollow) space, 11 a spherical porous shell wall, and 12 a second porous shell wall.

EXAMPLES OF THE INVENTION

More specific embodiments or examples of the present invention will now be explained. However, it will be obvious to those skilled in the art that the present invention is not limited thereto, and so may be appropriately modified if desired or if required.

Example 1

Thirty (30) spherical polymer particles (having high water absorption properties), which were swollen by the absorption of water therein and had a particle size of 8 mm, were tumbled on a 5 mm-thick layer of dried clay powders (50 grams) spread over a given sheet, so that their surfaces were uniformly covered with the powders to obtain spherical particles, each comprising a shell containing a 1.5 mm-thick hydrous clay powder layer.

The aforesaid spherical polymer particles (having high water absorption properties) swollen by the absorption of water therein, with a particle size of 8 mm, were prepared by immersing a polyacrcylate base polymer having high water absorption properties and a particle size of 1.5 mm in water the amount of which was 150 times as large as that of the polymer.

The aforesaid spherical polymer particles, each swollen by the absorption of water and comprising a skin shell made up of the hydrous clay powder layer, were dried in a drying furnace at 110° C. for 3 hours to obtain spheres having a particle diameter of 6 mm, a shell thickness of 1 mm, and a hollow space with an inner diameter of 4 mm.

Then, the dried spheres were fired in a firing furnace at 1,100° C. for 2 hours to obtain porous yet firm ceramic spheres, each having a hollow space. They were found to have a bulk specific gravity of 0.78 and a water absorption 33%.

Example 2

Fifty (50) polymer particles (having high water absorption), which were swollen by the absorption of water therein and had a particle size of 8 mm as in Example 1, were tumbled on a 5 mm-thick layer of dried clay powders (100 grams) spread over a given sheet, so that their surfaces were uniformly covered with the powders to obtain spherical particles, each comprising a shell containing a 1.5 mm-thick hydrous clay powder layer.

Then, the thus granulated spherical particles were transferred into a dielectric heating system (a microwave oven operating at a high-frequency output of 180 to 600 W and 2,450 MHz), and dielecrically heated therein for 20 minutes. In this dielectric heating process, the swollen polymer particles were rapidly deprived of water by evaporation, and the shell of the clay powder layer was dried into solid, yielding spheres, each having such a configuration as shown in FIG. 1, and such a sectional structure as shown in FIG. 2.

After this, the dried spherical particles were fired in an electric furnace at 1,150° C. for 2 hours.

This firing yielded porous ceramic spheres, each having a hollow space therein and having high hardness and strength, and being reduced in weight. These spheres could be used as a lightweight aggregate material, and were found to have a bulk specific gravity of 0.6 and be resistant to a temperature of 1,300° C.

Example 3

Drying was carried out following Example 1 with the exception that a mixture of 25 grams of chamotte powders and 25 grams of clay was used in place of 50 grains of clay powders. The obtained dry spherical particles were fired in a gas firing furnace at 1,300° C. for 2 hours.

This firing yielded porous ceramic spheres, each having a hollow space therein and comprising a porous shell, and having high hardness and strength. These spheres could be used as a lightweight aggregate material, and were found to have a bulk specific gravity of 0.6 and be resistant to a temperature of 1,400° C.

Example 4

Fifty (50) polymer particles (having high water absorption), which were swollen by the absorption of water therein and had a particle size of 8 mm as in Example 1, were tumbled on a 5 mm-thick layer of calcined alumina powders (50 grams; and containing 3% of a sintering mixture aid of CuO and $TiO_2$) spread over a given sheet, so that their surfaces were uniformly covered with the calcined alumina powders to obtain spherical particles, each comprising a shell containing a 1.5 mm-thick hydrous layer of calcined alumina powders.

Then, the spherical polymer particles, each swollen by the absorption of water and comprising a skin shell made up of a hydrous layer of calcined alumina powders, were dried in a drying furnace at 110° C. for 2 hours to obtain dried spherical particles having a particle size of 6 mm, a shell thickness of 1 mm, and a hollow space having an inner diameter of 4 mm therein.

After this, the dried spherical particles were fired in a firing furnace at 1,500° C. for 2 hours, yielding porous yet firm ceramic spheres of alumina, each having a hollow space therein.

The resultant porous ceramic spheres of alumina were lightweight ceramic spheres found to be resistant to high temperatures and have high hardness and strength.

Example 5

Fifty (50) polymer particles (having high water absorption), which were swollen by the absorption of water therein and had a particle size of 8 mm as in Example 1, were tumbled on a 5 mm-thick layer of calcined zirconia powders (50 grams; and containing 3% of a sintering aid of MgO) spread over a given sheet, so that their surfaces were uniformly covered with the calcined zirconia powders to obtain spherical particles, each comprising a shell containing a 1.5 mm-thick hydrous layer of calcined zirconia powders.

Then, the spherical polymer particles, each swollen by the absorption of water and comprising a skin shell made up of a hydrous layer of calcined zirconia powders, were dried in a drying furnace at 110° C. for 2 hours to obtain dried spherical particles having a particle size of 6 mm, a shell thickness of 1 mm, and a hollow space having an inner diameter of 4 mm therein.

After this, the dried spherical particles were fired in a firing furnace at 1,650° C. for 2 hours, yielding porous yet firm ceramic spheres of zirconia, each having a hollow space therein.

The resultant porous ceramic spheres of zirconia were lightweight yet tough ceramic spheres found to be resistant to high temperatures and have high hardness and strength.

Example 6

Fifty (50) polymer particles (having high water absorption), which were swollen by the absorption of water therein and had a particle size of 8 mm as in Example 1, were tumbled on a 5 mm-thick layer of calcined aluminum nitride powders (50 grams; and containing 5% of a sintering mixture aid of $Y_2O_3$ and CaO) spread over a given sheet, so that their surfaces were uniformly covered with the calcined aluminum nitride powders to obtain spherical particles, each comprising a shell containing a 1.5 mm-thick hydrous layer of calcined aluminum nitride powders.

Then, the spherical polymer particles, each swollen by the absorption of water and comprising a skin shell made up of a hydrous layer of calcined aluminum nitride powders, were dried in a drying furnace at 110° C. for 2 hours to obtain dried spherical particles having a particle size of 6 mm, a shell thickness of 1 mm, and a hollow space having an inner diameter of 4 mm therein.

After this, the dried spherical particles were fired in a non-oxidizing atmosphere-prevailing firing furnace at 1,820° C. for 2 hours, yielding porous yet firm ceramic spheres of aluminum nitride, each having a hollow space therein.

The resultant porous ceramic spheres of aluminum nitride were lightweight ceramic spheres found to be resistant to high temperatures and have high hardness, strength and thermal conductivity.

Example 7

One thousand (1,000) ml of ceramic spheres obtained as in Example 1 was immersed in 1,500 ml of a slurry obtained by adding and suspending the same clay in water (15% of clay and 85% of water) for 1 minute. The spheres were removed from the slurry, and charged into a sheath (having an internal volume of 15 cm×15 cm×15 cm), followed by drying, and firing at 1,150° C. for 2 hours. This firing yielded a porous ceramic sheet of 15 cm×15 cm×4 cm.

The porous ceramic sheet was a sheet form of agglomerate in which a multiplicity of ceramic spheres obtained as Example 1 were sintered together, with a thin sintered layer of clay, resulting from the slurry, provided at their areas of contact.

The porous ceramic sheet was a lightweight ceramic sheet improved in air permeability because of the presence of air permeability due to voids among the spheres and air permeability due to the porous shells of the individual spheres. The sheet was found to have a bulk specific gravity of 0.89.

The ceramic sheet could be suitably used in the form of filters, sound-shielding sheets, heat insulating sheet, etc.

Example 8

Thirty (30) polymer particles (having high water absorption properties), which were swollen by the absorption of water therein and had a particle size of 8 mm, were tumbled on a 5 mm-thick layer of dried clay powders (50 grams) spread over a given sheet, so that their surfaces were uniformly covered with the powders to obtain spherical particles, each comprising a shell containing a 1.5 mm-thick hydrous clay powder layer.

The aforesaid spherical polymer particles, each swollen by the absorption of water and comprising a skin shell made up of the hydrous clay powder layer, were dried in a drying furnace at 110° C. for 3 hours to obtain unfired ceramic spheres having a particle diameter of 6 mm, a shell thickness of 1 mm, and a hollow space with an inner diameter of 4 mm.

The unfired ceramic spheres were filled at a thickness of 50 mm in a alumina porcelain sheath of 100×100×100 in volume, followed by firing at 1,250° C. for 2 hours in a firing furnace. This firing yielded an air permeable sheet-like block in which porous ceramic spheres having a hollow space therein and comprising a firm shell were sintered together in point contact with one another.

The sheet-like block were improved in gas- and fluid-permeability, and so could provide excellent filter sheets, and sound-absorbing sheets.

APPLICABILITY OF THE INVENTION IN INDUSTRY

According to the present invention, it is possible to easily make granulated hollow products that have so far been difficult to make. It is also possible to freely control the particle size of granulated products to be obtained by controlling the particle size of a polymer having high water absorption properties, which is swollen by the absorption of water therein during the making process. The obtained spherical form of granulated products can be effectively used in various product forms in drug, fertilizer, foodstuff, feed, agricultural chemical, catalyst, ceramics, powder metallurgy, detergent, plastic, and bio-material fields, for instance, as catalysts, lightweight materials, sound-insulating materials, microcapsules, and lightweight aggregates.

What we claim is:

1. A method of making a granulated spherical solid shell having a spherical space therein, said method comprising:
   allowing a polymer particle having high water absorption properties to be swollen by absorption of water therein, and
   bringing the water-swollen polymer particle into contact with a powder to form a powder layer all over the surface of the water-swollen polymer particle resulting in the granulated spherical solid shell,
   followed by drying the granulated spherical solid shell.

2. A granulated product-making method as recited in claim 1, wherein said powder is an organic material.

3. A granulated product-making method as recited in claim 1, wherein said powder is an inorganic material.

4. A granulated product-making method as recited in claim 3, wherein said inorganic material is a ceramic raw material.

5. A granulated product-making method as recited in claim 4, wherein said ceramic raw material or ceramic is at least one member selected from the group consisting of clay, a clay mineral, chamotte, silica sand, steatite, feldspar, alumina, magnesia, mullite, zirconia, silica, cordierite, ferrite, apatite, blast-furnace slag, shirasu, fly ash, silicon carbide, aluminum nitride, and silicon nitride.

6. A granulated product-making method as recited in claim 4, wherein said ceramic raw material or ceramic is a mixture of a binder and at least one member selected from the group consisting of clay, a clay mineral, chamotte, silica sand, steatite, feldspar, alumina, magnesia, mullite, zirconia, silica, cordierite, ferrite, apatite, blast-furnace slag, shirasu, fly ash, silicon carbide, aluminum nitride, and silicon nitride.

7. A granulated product-making method as recited in any one of claim 1, wherein said powder contains a binder.

8. A granulated product-making method as recited in claim 1, wherein said drying is carried out by dielectric heating in a high-frequency dielectric heating system.

9. A granulated product-making method, characterized in that the granulated product obtained by the method recited in claim 1 is immersed in a liquid to impregnate the shell of said granulated product with said liquid.

10. A granulated product-making method as recited in claim 9, wherein said liquid is a metal salt solution.

11. A granulated product-making method, characterized in that the granulated product obtained by the method recited in claim 1 is immersed in a suspension of finely divided solid powder, and dried to incorporate the finely divided solid powder into the shell of said granulated product.

12. A granulated product-making method, characterized in that the granulated product obtained by the method recited in claim 1 is immersed in a liquid to occlude said liquid in the spherical space in said granulated product.

13. A granulated product-making method, characterized in that the granulated product obtained by the method recited in claim 1 is placed in a gas to occlude said gas in the spherical space in said granulated product.

14. A granulated product-making method as recited in claim 1, wherein said polymer having high water absorption properties is a spherical powder having a particle size of 0.02 to 3.0 mm.

15. A granulated product-making method as recited in claim 1, wherein said polymer having high water absorption properties is a small sphere having a particle diameter of 0.2 to 60.0 mm.

16. A granulated product-making method as recited in claim 1, wherein a ratio of the polymer having high water absorption properties to the water is 1:50 to 1:500.

17. A granulated product-making method as recited in claim 1, wherein said powder is a pharmaceutical material.

18. A granulated product-making method as recited in claim 1, wherein said powder is a fertilizer material.

19. A granulated product-making method as recited in claim 1, wherein said powder is a foodstuff material.

20. A granulated product-making method as recited in claim 1, wherein said powder is a cement material.

21. A granulated product-making method as recited in claim 1, wherein said powder is a feed material.

22. A granulated product-making method as recited in claim 1, wherein said powder is a coloring material.

23. A granulated product-making method as recited in claim 1, wherein said powder is a material for agricultural chemicals.

24. A granulated product-making method as recited in claim 1, wherein said powder is a cosmetic material.

25. A granulated product-making method as recited in claim 1, wherein said powder is an enzyme-containing material.

26. A granulated product-making method as recited in claim 1, wherein said powder is a surfactant material.

27. A granulated product-making method as recited in claim 1, wherein said powder is a semiconductor material.

28. A granulated product-making method as recited in claim 1, wherein said powder is a metal material.

29. A granulated product-making method as recited in claim 1, wherein said powder is a multi-capsulated material.

30. A granulated product-making method as recited in claim 1, wherein said powder is a cermet material.

31. A granulated product-making method as recited in claim 1, wherein said powder is a paint coating material.

32. A granulated product-making method as recited in claim 1, wherein said powder is a filtering material.

33. A granulated product-making method as recited in claim 1, wherein said powder is a heat-insulating material.

34. A granulated product-making method as recited in claim 1, wherein said powder is a sound-absorbing material.

35. A granulated product-making method as recited in claim 1, wherein said powder is an electric wave-absorbing material.

36. A granulated product-making method as recited in claim 1, wherein said powder is a light-absorbing material.

37. A granulated product-making method as recited in claim 1, wherein said powder is a reflecting material.

38. A granulated product-making method as recited in claim 1, wherein said powder is a signposting material.

39. A granulated product-making method as recited in claim 1, wherein said powder is a ball bearing material.

40. A granulated product-making method as recited in claim 1, wherein said powder is a bio-reactor material.

41. A granulated product-making method as recited in claim 1, wherein said powder is a far infrared ray-radiating material.

42. A granulated product-making method as recited in claim 1, wherein said powder is an electric heating material.

43. A granulated product-making method as recited in claim 1, wherein said powder is a lightweight aggregate material.

44. A granulated product-making method as recited in claim 1, wherein said powder is a material for ball games.

45. A granulated product-making method as recited in claim 1, wherein said powder is a dehumidifying material.

46. A granulated product-making method as recited in claim 1, wherein said powder is a furnace material.

47. A granulated product-making method as recited in claim 1, wherein said powder is a material for engine room walls.

48. A granulated product-making method as recited in claim 1, wherein said powder is a material for gas turbine room walls.

49. A granulated product-making method as recited in claim 1, wherein said powder is a lining material.

50. A granulated product-making method as recited in claim 1, wherein said powder is a material for vent holes.

51. A granulated product-making method as recited in claim 1, wherein said powder is a soil material.

52. A granulated product-making method as recited in claim 1, wherein said powder is a bio-material or a bio-ceramic material.

53. A granulated product-making method as recited in claim 1, wherein said powder is a material for slopes.

54. A granulated product-making method as recited in claim 1, wherein said powder is an apatite material.

55. A granulated product-making method as recited in claim 1, wherein said powder is a material having delayed action.

56. A granulated product-making method as recited in claim 1, wherein said powder is a plastic material.

57. A granulated product-making method as recited in claim 1, wherein said powder is a photosensitive material.

58. A granulated product-making method as recited in claim 1, wherein said powder is a hydrogen occluding material.

59. A granulated product-making method as recited in claim 1, wherein said powder is a material for musical instruments.

60. A granulated product-making method as recited in claim 1, wherein said powder is an acoustic or speaker material.

61. A granulated product-making method as recited in claim 1, wherein said powder is an ozone-decomposing material.

62. A granulated product-making method as recited in claim 1, wherein said powder is a porcelain enamel material.

63. A granulated product-making method as recited in claim 1, wherein said powder is a glazing material.

64. A granulated product-making method as recited in claim 1, wherein said powder is an aerospace material.

65. A granulated product-making method as recited in claim 1, wherein said powder is a material for solar furnaces.

66. A granulated product-making method as recited in claim 1, wherein said powder is an artificial dental material.

67. A granulated product-making method as recited in claim 1, wherein said powder is a tile material.

68. A granulated product-making method as recited in claim 1, wherein said powder is a pigment material.

69. A granulated product-making method as recited in claim 1, wherein said powder is a filler material.

70. A granulated product-making method as recited in claim 1, wherein said powder is a main adhesive component material.

71. A granulated product-making method as recited in claim 1, wherein said powder is an ultrafine particle material.

72. A granulated product-making method as recited in claim 1, wherein said powder is a permanent magnet material.

73. A granulated product-making method as recited in claim 1, wherein said powder is a shape-memory material.

74. A method of making an agglomerate comprising a multiplicity of granulated products that are agglomerated and bound together, characterized in that a multiplicity of discrete granulated products obtained by the method recited in claim 1 are agglomerated and bound together into an agglomerate.

75. A method of making a sintered agglomerate, characterized in that a multiplicity of discrete granulated products obtained by the method recited in claim 1 are sintered into a sintered agglomerate.

76. A granulated product-making method as recited in claim 1, wherein a plurality of different layers are coated on a granulated product to obtain a granulated product comprising a spherical, multilayered solid shell.

77. An agglomerate-making method, characterized in that a multiplicity of discrete granulated products as recited in claim 76 are agglomerated and bound together into an agglomerate.

78. A sintered agglomerate-making method, characterized in that a multiplicity of discrete granulated products as recited in claim 76 are agglomerated and bound together into a sintered agglomerate.

79. A granulated product-making method as recited in claim 1, wherein said granulated product is at least one member selected from the group consisting of (1) a pharmaceutical substance, (2) a fertilizer, (3) foodstuff, (4) cement, (5) feed, (6) a coloring material, (7) agricultural chemicals, (8) a cosmetic material, (9) an enzyme-containing material, (10) a surfactant, (11) a semiconductor, (12) a metal, (13) a multi-capsulated structure, (14) cermet, (15) a paint coating material, (16) a filtering material, (17) a heat-insulating material, (18) a sound-absorbing material, (19) an electric wave-absorbing material, (20) a light-absorbing material, (21) a reflecting material, (22) a sign-posting material, (23) a ball bearing, (24) a bio-reactor, (25) a far infrared ray-radiating material, (26) an electric heating material, (27) a light-weight aggregate, (28) a material for ball games, (29) a dehumidifying material, (30) a furnace material, (31) a material for engine room walls, (32) a material for gas turbine room walls, (33) a lining material, (34) a material for vent holes, (35) a soil material, (36) a bio-material or bio-ceramics, (37) a material for slopes, (38) an apatite material, (39) a material having delayed action, (40) a plastic material, (41) a photosensitive material, (42) an hydrogen occluding material, (43) a material for musical instruments, (44) an acoustic material, (45) an ozone-decomposing material, (46) a porcelain enamel material, (47) a glazing material, (48) an aerospace material, (49) a solar furnace material, (50) an artificial dental material, (51) a tile material, (52) a pigment, (53) a filler material, (54) a main adhesive component material, (55) an ultrafine particle material, (56) a permanent magnet material, and (57) a shape-memory material.

80. A method of making a granulated product as recited in claim 1, characterized by allowing a polymer particle having high water absorption properties to be swollen by absorption of water therein, depositing a first powder layer on a surface of said polymer particle, depositing one or more powder layers on said first powder layer, and drying a multilayered structure to obtain a granulated spherical product of the multilayered structure having a spherical space therein.

81. A method of making a granulated product as recited in claim 1, characterized by allowing a polymer particle having high water absorption properties to be swollen by absorption of water therein, depositing a first powder layer on a surface of said polymer particle, depositing one or more powder layers on said first powder layer, and drying and firing a multilayered structure to obtain a granulated spherical product of the multilayered structure having a spherical space therein.

82. A granulated product-making method as recited in claim 1, characterized by depositing a powder mixture comprising two or more different powders on a surface of a polymer particle having high water absorption properties, said polymer particle being swollen by absorption of water therein, followed by drying, thereby obtaining a granulated product comprising a spherical solid shell that is formed by binding said different powders together and has a spherical space therein.

83. A granulated product-making method as recited in claim 1, characterized by depositing a powder mixture comprising two or more different powders on a surface of a polymer particle having high water absorption properties, said polymer particle being swollen by absorption of water therein, followed by drying and firing, thereby obtaining a granulated product comprising a spherical solid shell that is formed by binding said different powders together and has a spherical space therein.

84. A granulated product-making method as recited in claim 1, characterized by depositing a binder on a surface of a polymer particle having high water absorption properties, said polymer particle being swollen by absorption of water therein, and depositing a powder on a surface of said binder, followed by drying, thereby obtaining a granulated product comprising a spherical solid shell and having a spherical space therein.

85. A granulated product-making method as recited in claim 1, characterized by depositing a binder on a surface of a polymer particle having high water absorption properties, said polymer particle being swollen by absorption of water therein, and depositing a powder on a surface of said binder, followed by drying and firing, thereby obtaining a granulated product comprising a spherical solid shell and having a spherical space therein.

86. A method of making a granulated spherical ceramic shell having a spherical space therein, said method comprising:

allowing a polymer particle having high water absorption properties to be swollen by absorption of water therein, and bringing the water-swollen polymer particle into contact with a ceramic raw material powder to form a ceramic raw material powder layer all over the surface of the water-swollen polymer particle resulting in the granulated spherical ceramic shell, followed by drying and firing the granulated spherical ceramic shell.

87. A granulated ceramic product-making method as recited in claim 86, wherein said drying and said firing are carried out by dielectric heating in a high-frequency dielectric heating system.

* * * * *

UNITED STATES PATENT AND TRADEMARK OFFICE
CERTIFICATE OF CORRECTION

PATENT NO.     : 6,210,625 B1
DATED          : April 3, 2001
INVENTOR(S)    : Matsushita et al.

It is certified that error appears in the above-identified patent and that said Letters Patent is hereby corrected as shown below:

<u>Title page,</u>
Delete "[73] Assignee: Mikuni Corporation, Kushiro (JP)"

Signed and Sealed this

Twelfth Day of November, 2002

Attest:

Attesting Officer

JAMES E. ROGAN
*Director of the United States Patent and Trademark Office*